United States Patent
Wilson et al.

(10) Patent No.: US 9,845,422 B2
(45) Date of Patent: Dec. 19, 2017

(54) METHODS OF DELIVERING CALCIUM CARBONATE PRODUCING MICROBES OR ENZYMES DOWNHOLE

(71) Applicants: Michael B. Wilson, Tomball, TX (US); Mark A. Vorderbruggen, Spring, TX (US); Charles David Armstrong, Tomball, TX (US)

(72) Inventors: Michael B. Wilson, Tomball, TX (US); Mark A. Vorderbruggen, Spring, TX (US); Charles David Armstrong, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 64 days.

(21) Appl. No.: 14/822,234

(22) Filed: Aug. 10, 2015

(65) Prior Publication Data
US 2017/0044420 A1 Feb. 16, 2017

(51) Int. Cl.
| | |
|---|---|
| *E21B 43/22* | (2006.01) |
| *C09K 8/467* | (2006.01) |
| *C04B 20/12* | (2006.01) |
| *C04B 24/14* | (2006.01) |
| *C04B 28/10* | (2006.01) |
| *C04B 20/10* | (2006.01) |
| *C09K 8/42* | (2006.01) |

(52) U.S. Cl.
CPC .......... *C09K 8/467* (2013.01); *C04B 20/1018* (2013.01); *C04B 20/1033* (2013.01); *C04B 20/12* (2013.01); *C04B 24/14* (2013.01); *C04B 28/10* (2013.01); *C09K 8/426* (2013.01); *C09K 2208/18* (2013.01)

(58) Field of Classification Search
CPC ........ C09K 2208/24; C09K 8/52; C09K 8/90; C09K 8/035; C09K 8/68; C09K 8/74; C09K 8/805; C04B 24/38; E21B 43/26
See application file for complete search history.

(56) References Cited

U.S. PATENT DOCUMENTS

| | | | |
|---|---|---|---|
| 6,110,875 A * | 8/2000 | Tjon-Joe-Pin | C04B 24/38 166/246 |
| 7,036,586 B2 | 5/2006 | Roddy et al. | |
| 7,135,231 B1 | 11/2006 | Sinclair et al. | |
| 8,592,353 B2 | 11/2013 | Dalrymple et al. | |
| 2012/0199046 A1 | 8/2012 | Jonkers | |
| 2013/0112114 A1 | 5/2013 | Jonkers | |
| 2015/0122486 A1 | 5/2015 | Luke et al. | |

FOREIGN PATENT DOCUMENTS

| | | | |
|---|---|---|---|
| CN | 104099082 A | * | 10/2014 |
| WO | 2006066326 | | 6/2006 |
| WO | 2010122545 | | 10/2010 |

OTHER PUBLICATIONS

Baker Hughes; "GeoFORM Conformable Sand Managment System Using Morphic Technology"; www.bakerhughes.com; May 2013, 2 pages.
International Search Report, International Application No. PCT/US2016/046153, dated Oct. 31, 2016, Korean Intellectual Property Office; International Search Report 5 pages.
Written Opinion, International Application No. PCT/US2016/046153, dated Oct. 31, 2016, Korean Intellectual Property Office; Written Opinion 6 pages.

* cited by examiner

*Primary Examiner* — Zakiya W Bates
(74) *Attorney, Agent, or Firm* — Cantor Colburn LLP

(57) ABSTRACT

A method of delivering a microbe or enzyme to a selected location comprises conveying a coated aggregate to a selected location; wherein the coated aggregate comprises an aggregate and a coating disposed on the aggregate; the coating comprising a polymer matrix and a calcium carbonate producing agent comprising a microbe, an enzyme, or a combination comprising at least one of the foregoing.

23 Claims, No Drawings

METHODS OF DELIVERING CALCIUM CARBONATE PRODUCING MICROBES OR ENZYMES DOWNHOLE

BACKGROUND

The disclosure is directed to methods of delivering microbes or enzymes, and in particular to methods of delivering calcium carbonate producing microbes or enzymes downhole in well cementing applications.

Microbes and enzymes can be delivered downhole by dispersing or dissolving in a fluid first then pumping the fluid into a wellbore. In many circumstances, other additives such as nutrients for the microbes also need to be dissolved or dispersed in the fluid. Due to the difficulties of assuring that the required amounts of each of the chemicals, microbes, or enzymes are delivered to the desired location, large excess of chemicals, microbes, or enzymes may have to be used. Accordingly, the art would be receptive to alternative methods of delivering microbes and enzymes downhole.

BRIEF DESCRIPTION

A method of delivering a microbe or enzyme to a selected location comprises conveying a coated aggregate to the selected location; wherein the coated aggregate comprises an aggregate and a coating disposed on the aggregate; the coating comprising a polymer matrix and a calcium carbonate producing agent comprising a microbe, an enzyme, or a combination comprising at least one of the foregoing.

Also disclosed are coated aggregates and settable compositions comprising the coated aggregate.

DETAILED DESCRIPTION

It has been found that calcium producing microbes, enzymes, or a combination thereof can be effectively delivered to a desired location once they are coated on an aggregate together with a polymer matrix. The method allows for easier adjustments to the concentrations of the microbes and enzymes. The coated aguegate can be stored for a longer period of time as compared to microbes and enzymes not coated on the aggregate. Moreover, the activation of the microbes and enzymes can be delayed until they are delivered to the desired location. Accordingly, a method of delivering a microbe or enzyme to a selected location comprises conveying a coated aggregate to the selected location. In an embodiment, conveying the coated aggregate comprises pumping the coated aggregate into a wellbore penetrating a subterranean formation. The method further comprises activating the calcium carbonate producing agent.

The coated aggregate comprises an aggregate and a coating disposed on the aggregate. The term "aggregate" is used broadly to refer to a number of different types of both coarse and fine particulate material, including, but are not limited to, sand, gravel, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate comprises sand such as sand grains. The sand grains can have a size from about 1 µm to about 2000 µm, specifically about 10 µm to about 1000 µm, and more specifically about 10 µm to about 500 µm. As used herein, the size of a sand grain refers to the largest dimension of the grain.

The coating comprises a polymer matrix and a calcium carbonate producing agent comprising a microbe, an enzyme, or a combination comprising at least one of the foregoing.

The materials for the polymer matrix include cured, partially cured, or uncured thermoset or thermoplastic polymers. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof. Curing the polymers of the polymer matrix occurs before or after disposal of the coated aggregate in the settable composition or before or after disposal of the settable composition to a per-determined location, for example.

Exemplary materials for the polymer matrix include epoxy, phenolic, melamine-formaldehyde, polyurethane, carbamate, polycarbodiimide, polyamide, polyamide imide, furan resins, polyolefin such as polyethylene, polystyrene, or a combination comprising at least one of the foregoing. The phenolic resin includes, e.g., a phenol formaldehyde resin obtained by the reaction of phenol, bisphenol, or derivatives thereof with formaldehyde. The curing agent for the polymer matrix is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the aggregate particles include a crosslinked coating. The crosslinked coating typically provides crush strength, or resistance, for the aggregate particles and prevents agglomeration of the aggregate particles even under high pressure and temperature conditions. In some embodiments, the aggregate particles have a curable coating, which cure subsurface, e.g. downhole. The curable coating cures under the high pressure and temperature conditions in the subsurface reservoir. Thus, the aggregate particles having the curable coating are used for high pressure and temperature conditions.

Microbes that have the ability to induce the precipitation of calcium carbonate include those from the genera such as *Bacillus* sp., *Sporosarcina* sp., *Spoloactobacilus* sp., *Clostridium* sp., *Desulfotomaculum* sp. or a combination thereof. Exemplary and non-limiting microbes include *Sporosarcina pasteurii* (formerly known as *Bacillus pasteurii*), *Bacillus megaterium, Sporosarcina ureae, Pseudomonas aeruginosa, Proteus Vulgaris, Bacillus sphaericus, Myxococcus xanthus, Leuconostoc mesenteroides, Bacillus subtilis, Deleya halophila, Halomonas eurihalina, Proteus mirabilis* and *Helicobacter pylori*. Non-pathogenic strains are preferred. *Sporosarcina pasteurii* is specifically mentioned. A combination of different microbes may be used. As used herein, the microbe includes bacteria and bacteria spores. In an embodiment, the coated aggregate contains about $1.0 \times 10^3$ to $1.0 \times 10^8$ bacterial spores/bacteria per gram of the aggregate.

Suitable calcium carbonate precipitating enzyme includes urease (EC 3.5.1.5), amidase (EC 3.5.1.4), carbonic anhydrase (EC 4.2.1.1), glutamade dehydrogenase such as NAD (P) type (EC 1.4.1.3), glutamate synthase such as NADPH type (EC 1.4.1.13) and FAD type (EC 1.4.7.1). Urease is specifically mentioned. Urease is commercially available. It can be extracted from Jack beans (*Canavalia ensiformis*), watermelon seeds, pea seeds, and the like. Optionally, the coating also comprises an enzyme stabilizer. Exemplary stabilizers include but are not limited to casein, albumin, powdered milk, whey protein, or bovine serum albumin, or a combination comprising at least one of the foregoing. The presence of enzyme stabilizers can enhance the activity of the enzymes. In an embodiment an enzyme stabilizer increases the $CaCO_3$ precipitation compared to the same composition without the stabilizer, specifically, the amount of precipitated $CaCO_3$ formed from an enzyme in the presence of an enzyme stabilizer is about two times greater, five times greater, or ten times greater than the amount of precipitated $CaCO_3$ formed from an enzyme without the stabilizer. In an embodiment, the coated aggregate contains about 0.01 wt % to about 80 wt. % or about 0.1 wt. % to about 80 wt. %, or about 1 wt. % to about 80 wt. % of enzymes, or about 5 wt. % to about 70 wt. %, based on the total weight of the coating.

Optionally, the coating further comprises urea, a calcium ion source, a nutrient for the microbe, a stabilizer for the enzyme, or a combination comprising at least one of the foregoing.

The effective amount of urea will depend on the amount of the other components and will be enough to ensure the formation of the material of desired strength at a desired rate. In an embodiment, the effective amount of urea in the coating is about 1 wt % to about 20 wt. % or about 5 wt. % to about 10 wt. %, based on the total weight of the coating.

The calcium ion sources include calcium chloride, calcium bromide, calcium nitrate, or a combination comprising at least one of the foregoing. In an embodiment, the calcium ion source is present in an amount of about 5 wt. % to about 20 wt. % or about 10 wt. % to about 15 wt. %, based on the total weight of the coating. In the event that a liquid carrier fluid contains sufficient amount of calcium ion source, no additional calcium ion source needs to be separately added to the coating.

In an embodiment, the coating contains nutrients necessary to ensure microbes' survival and multiplication. The nutrients are known to those skilled in the art. They provide the microbes with a source of carbon, nitrogen, and/or other elements essential for their physiological function. If several types of microbes are used, it may be necessary to use different nutrients, corresponding to the needs of each type of microbes. Exemplary nutrients include yeast extract, peptone from soy, industry byproducts such as lactose mother liquor, and corn steep liquor. It is appreciated that water, if present in the nutrients, can be removed during the coating process.

The components of the coating can be present in more than one layer. The compositions for each layer can be the same or different. For example, the coated aggregate comprises a first layer disposed on the aggregate, wherein the first layer comprises the calcium carbonate producing agent and a polymer matrix; and a second layer disposed on the first layer, wherein the second layer comprises the same or different composition as compared to the first layer.

Optionally, in any of the foregoing embodiments, the coating or individual layers are disposed directly on the aggregate or other layers, that is, no intervening layers are present other than those described. The coatings and layers can be continuous or discontinuous. To optimize the controlled release of the calcium carbonate producing agent the coating covers 80 to 100% of the surface area of the aggregate. For coatings having more than one layer, each layer covers 80 to 100% of the surface area of the aggregate or the underlying layer.

The thickness of the coating is adjusted to provide the desired controlled release of the microbe or enzyme component in the coating. In an embodiment, the total thickness of the coating is about 0.1 to about 50 micrometers. Within this range, the thickness may be greater than or equal to about 0.5 micrometer, or greater than or equal to 1 micrometers. Also within this range the thickness may be less than or equal to 25, or less than or equal to 10 micrometers. The amount of the coating is from about 0.5 to about 10% by weight of the coated aggregate particles.

The coated aggregates can be manufactured by various methods. The aggregates can be coated by spray coating (for example, top, bottom, or side spray coating), drum coating, pan coating, fluid bed coating, continuous pour coating, or any other method known to those of skill in the art.

According to an embodiment, the coating is disposed on the aggregate particles by mixing in a vessel, e.g., a reactor. Individual components, e.g., the aggregate particles, enzymes/microbes, and polymer materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating.

In another embodiment, the coating is disposed on the particle via spraying such as by contacting the aggregate particles with a spray of the coating material. The coated aggregate particles are heated to induce crosslinking of the coating.

As another example, the process, as disclosed in U.S. Pat. No. 7,135,231, may include heating the aggregate particles to a temperature between from about 90° C. to about 450° C., adding the heated particles to a mixing apparatus, if necessary, and then applying a coupling agent, such as a polyamine, onto the surface of the particles. A resin coating may then be sputtered onto at least a portion of the surface of the particles. If additional coating is necessary, the process can include sputtering additional coats onto the aggregate particles in an incremental manner, such that the resultant coated particulate has a plurality of interleaved coats fully coating the aggregate particles.

Low temperature curing methods may be employed (e.g., using fast setting "cold set" or "cold cure" polymer matrix materials), where heating may be a problem, such as when coating materials which may be sensitive to heat. Alternatively, indirect heating processes may be employed with such materials when it is necessary to heat a coating material for cure.

The coating can be conducted in a batch or in a continuous process. The aggregates can be coated with a single layer in a single coating application, or the aggregates can be coated with multiple layers of the same coating material, such as, two, three, four, five, or more layers. When coating the aggregate, the coating materials including the microbes, the enzymes, or the polymer matrix materials can be dissolved or suspended in a solvent, applied to the aggregates, and the solvent evaporated. This process may be repeated one or more times to produce multiple layers of the same or different coating materials surrounding the aggregate.

The coated aggregate can be included in a settable composition and then delivered downhole. The method further comprises allowing the settable slurry to set. In an embodiment, the calcium carbonate producing agent is present in an amount effective to set the settable composition in about 10 minutes to about 48 hours, about 30 minutes to about 36 hours, about 1 hour to about 24 hours, or about 2 hours to about 20 hours in the wellbore.

The settable composition optionally further comprise uncoated aggregate particles. The aggregates of the coated and uncoated particles can be the same or different. In an embodiment, the weight ratio of the microbe or enzyme coated aggregate relative to the uncoated aggregate is about 1:99 to about 99:1 or about 1:9 to about 9:1. The sum of the weights of the coated aggregate and the uncoated aggregate is about 10 wt. % to about 95 wt. %, about 20 wt. % to about 80 wt. %, about 20 wt. % to about 70 wt. %, about 20 wt. % to about 40 wt. %, about 50 wt. % to about 90 wt. %, about 50 wt. % to about 80 wt. %, or about 50 wt. % to about 70 wt. %, based on the total weight of the settable composition.

The settable composition can further comprise an aqueous carrier fluid. The aqueous carrier fluid is present in an amount of about 10% to about 60% by weight, more specifically in an amount of about 20% to about 40% by weight, based on the total weight of the settable composition. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt. %, based on the weight of the brine.

The settable compositions can further comprise various additives. Exemplary additives include a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, or a combination comprising at least one of the foregoing. These additive components are selected to avoid imparting unfavorable characteristics to the settable slurry, and to avoid damaging the wellbore or subterranean formation. Each additive can be present in amounts known generally to those of skill in the art.

Reinforcing agents include fibers such as metal fibers and carbon fibers, silica flour, and fumed silica. The reinforcing agents act to strengthen the set material formed from the settable compositions.

Self-healing additives include swellable elastomers, encapsulated cement particles, and a combination comprising at least one of the foregoing. Self-healing additives are known and have been described, for example, in U.S. Pat. Nos. 7,036,586 and 8,592,353.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Weighting agents are high-specific gravity and finely divided solid materials used to increase density, for example silica flour, fly ash, calcium carbonate, barite, hematite, ilemite, siderite, and the like.

Extenders include low density aggregates as described above, clays such as hydrous aluminum silicates (e.g., bentonite (85% mineral clay smectite), pozzolan (finely ground pumice of fly ash), diatomaceous earth, silica, e.g., α quartz and condensed silica fumed silica, expanded Pearlite, gilsonite, powdered coal, and the like.

The aqueous carrier fluid of the settable composition can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the settable compositions in an amount of about 1% to about 5% by volume of water in the settable compositions.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl.

The solid content of the settable composition is about 50 to about 95 wt. % based on the total weight of the composition, preferably about 60 to about 90 wt. % based on the total slurry weight, more preferably about 65 to about 85 wt. %, based on the total weight of the composition.

The density of the settable composition can vary widely depending on downhole conditions. Such densities can include about 5 to about 12 pounds per gallon when foamed. When unfoamed the density of a settable composition can vary with such densities between about 9 up to about 15 pounds per gallon, or about 10 to about 14 pounds per gallons, or about 11 up to about 13 pounds per gallon. Of course, the settable compositions can also be higher density, for example about 15 to about 22 pounds per gallon.

The various properties of the settable composition can be varied and adjusted according to well control and compatibility parameters of the particular fluid with which it is associated for example a drilling fluid. The settable composition can be used to form downhole components, including various casings, seals, plugs, packings, liners, and the like. In an embodiment the component is a plug, including a temporary plug, permanent plug, or a whipstock plug. The whipstock plug can be used to kick off from a vertical wellbore when a directional change in drilling is desired. The settable composition can be used in vertical, horizontal, or deviated wellbores.

In general, the components of the settable compositions can be premixed or is injected into the wellbore without mixing, e.g., injected "on the fly" where the components are combined as they are being injected downhole. A pumpable or pourable aqueous settable composition can be formed by any suitable method. In an exemplary embodiment, the components of the settable component is combined using conventional cement mixing equipment or equipment used in fracturing operations. The settable composition can then be injected, e.g., pumped and placed by various conventional cement pumps and tools to any desired location within the wellbore to fill any desired shape form. In an embodiment, injecting the settable composition comprises pumping the composition via a tubular in the wellbore. For example, the settable composition containing the coated aggregate can be pumped into an annulus between a tubular and a wall of the wellbore via the tubular.

The calcium carbonate producing agent can be activated by releasing the calcium carbonate producing agent from the coating and contacting the released calcium carbonate producing agent with urea, a calcium ion source, and water. If the calcium carbonate producing agent comprises a microbe, a nutrient is also brought into contact with the microbe during the activation. If a carbonate producing agent comprises an enzyme, a stabilizer is optionally brought into contact with the enzyme.

In an embodiment, the calcium carbonate producing agent is released and activated simultaneously or substantially simultaneously. For example, the coating can comprise urea, a calcium ion source, and necessary nutrients and stabilizers. When the coating is broken in the present of water, the calcium carbonate producing agent is released and contacted with all the necessary ingredients for it to produce calcium carbonate. It is appreciated that one or more of the urea, calcium ion source, and necessary nutrients and stabilizer can also be present in an aqueous fluid that carries the coated aggregate rather than in the coating of the coated aggregate. Of course the urea, calcium ion source, nutrients, or stabilizers can be present in both the coating and the carrier fluid.

In another embodiment, the calcium carbonate producing agent is released and activated sequentially. For example, the calcium carbonate producing agent can be released first, and after a period of time such as a few minutes, a few hours, or a few days, the released calcium carbonate producing agent is contacted with all the necessary ingredients for it to produce calcium carbonate. In an embodiment, at least one of urea, calcium ion source, water, or nutrient is contacted with calcium carbonate producing agent after it is released from the coating.

Releasing the calcium carbonate producing agent from the coating comprises abrading the coated aggregate with an uncoated aggregate. During injection or pumping of the settable composition, the abrasion among the coated aggregate and the uncoated aggregate breaks the coating on the coated aggregate and releases the enzymes or microbes. Without wishing to be bound by theory, it is believed that contact with hydrophilic and/or hydrophobic fluids may also cause release of the calcium carbonate precipitating agent from the coating. Further without wishing to be bound by theory, it is believed that temperature change may induce some release of the calcium precipitating agent from the coating.

Once the settable composition has been placed and assumed the shape form of the desired downhole article, the composition is allowed to set. During setting, the microbe or enzyme hydrolyzes urea producing ammonia and carbon dioxide thus increasing the pH of the slurry. The rise in pH facilitates the formation of a calcium carbonate precipitate from calcium ions and carbon dioxide. The precipitated calcium carbonate fills the gaps among aggregate particles thus cementing or bonding the aggregate particles together. The set composition forms a permanent shape of an article, for example, a plug. Depending on the requirements of a particular application, the microbes or enzymes are present in an amount such that the settable slurry reaches at least about 60-90% of its final strength within about 1-10 hours or 2-8 hours after pumped downhole.

Although the methods have been described in the context of delivering calcium carbonate producing microbes and enzymes downhole, it is appreciated that coated aggregates can be delivered to any desirable locations.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of delivering a microbe or enzyme to a selected location, the method comprising:
    conveying a coated aggregate to a selected location; the coated aggregate comprising an aggregate and a coating disposed on the aggregate; the coating comprising a polymer matrix and a calcium carbonate producing agent comprising a microbe, an enzyme, or a combination comprising at least one of the foregoing;

releasing the calcium carbonate producing agent from the coating; and contacting the released calcium carbonate producing agent with urea, a calcium ion source, and water.

2. The method of claim 1, wherein conveying the coated aggregate comprises pumping the coated aggregate into a wellbore penetrating a subterranean formation.

3. The method of claim 2, wherein conveying the coated aggregate comprises pumping a settable composition comprising the coated aggregate into the wellbore.

4. The method of claim 3, wherein the settable composition further comprises an uncoated aggregate.

5. The method of claim 4, wherein the weight ratio of the coated aggregate relative to the uncoated aggregate is about 1:99 to about 99:1.

6. The method of claim 4, wherein the weight ratio of the coated aggregate relative to the uncoated aggregate is about 1:9 to about 9:1.

7. The method of claim 4, wherein the sum of the weights of the coated aggregate and uncoated aggregate is about 10 wt. % to about 95 wt. % based on the total weight of the settable composition.

8. The method of claim 4, wherein the sum of the weights of the coated aggregate and uncoated aggregate is about 20 wt. % to about 70 wt. % based on the total weight of the settable composition.

9. The method of claim 3, further comprising allowing the settable composition to set.

10. The method of claim 9, wherein the calcium carbonate producing agent is present in an amount effective to set the settable composition in about 10 minutes to about 48 hours in the wellbore.

11. The method of claim 1,
the released calcium carbonate producing agent is contacted with urea, the calcium ion source, water, and a nutrient provided that the calcium carbonate producing agent comprises a microbe.

12. The method of claim 11, wherein the nutrient comprises yeast extract, peptone from soy, lactose mother liquor, corn steep liquor, or a combination comprising at least one of the foregoing.

13. The method of claim 1, wherein releasing the calcium carbonate producing agent from the coating comprises abrading the coated aggregate with an uncoated aggregate.

14. The method of claim 1, further comprising coating the aggregate to form the coated aggregate.

15. The method of claim 14, wherein coating the aggregate comprises spray coating, drum coating, pan coating, fluid bed coating, continuous pour coating, or a combination comprising at least one of the foregoing.

16. The method of claim 1, wherein the polymer matrix comprises an epoxy, a phenolic resin, a melamine-formaldehyde, a polyurethane, a carbamate, a polycarbodiimide, a polyamide, a polyamide imide, a furan resin, a polyolefin, or a combination comprising at least one of the foregoing.

17. The method of claim 1, wherein microbe is from a genus selected from *Bacillus* sp., *Sporosarcina* sp., *Spoloactobacilus* sp., *Clostridium* sp., *Desulfotomaculum* sp., or a combination thereof.

18. The method of claim 1, wherein the microbe comprises *Sporosarcina pasteurii*; *Bacillus megaterium, Sporosarcina ureae*; *Pseudomonas aeruginosa*; *Proteus Vulgaris*; *Bacillus sphaericus*; *Myxococcus xanthus*; *Leuconostoc mesenteroides*; *Bacillus subtilis*; *Deleya halophila*; *Halomonas eurihalina, Proteus mirabilis*; or *Helicobacter pylori*, or a combination comprising at least one of the foregoing; and the enzyme comprises urease, amidase, carbonic anhydrase, glutamade dehydrogenase, glutamate synthase, or a combination comprising at least one of the foregoing.

19. The method of claim 1, wherein the coating further comprises urea, a calcium ion source, a nutrient for the microbe, a stabilizer for the enzyme, or a combination comprising at least one of the foregoing.

20. The method of claim 19, wherein the nutrient comprises yeast extract, peptone from soy, lactose mother liquor, corn steep liquor, or a combination comprising at least one of the foregoing.

21. The method of claim 19, wherein the stabilizer comprises casein, albumin, powdered milk, whey protein, or bovine serum albumin, or a combination comprising at least one of the foregoing.

22. The method of claim 1, wherein the coating has a thickness of about 0.1 to about 50 micrometers.

23. The method of claim 1, wherein the aggregate comprises sand, gravel, crushed stone, slag, recycled concrete, silica, grass spheres, limestone, feldspar, or a combination comprising at least one of the foregoing.

* * * * *